April 8, 1969   K. G. SLOTKOWSKI   3,437,901
CONSTANT SPEED COMPENSATED ELECTRONIC CONTROL CIRCUIT
Filed Sept. 27, 1965
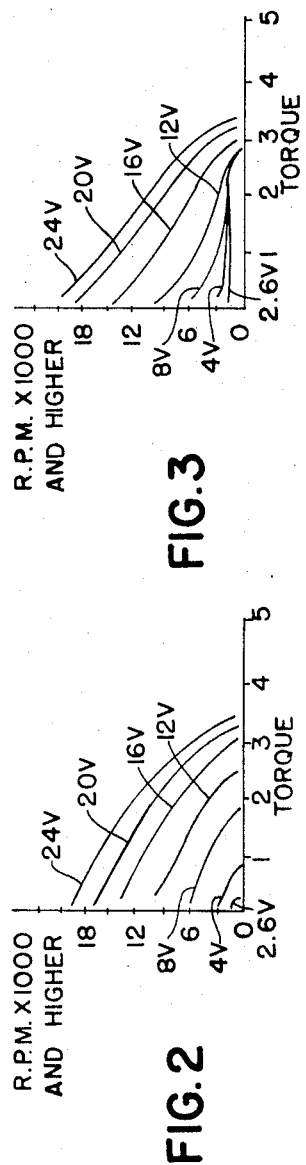
INVENTOR.
KENNETH G. SLOTKOWSKI
BY Whittemore,
Hulbert & Belknap
ATTORNEYS United States Patent Office 3,437,901
Patented Apr. 8, 1969

3,437,901
CONSTANT SPEED COMPENSATED ELECTRONIC CONTROL CIRCUIT
Kenneth G. Slotkowski, Oak Park, Mich., assignor, by mesne assignments, to Ritter Pfaudler Corporation, Rochester, N.Y., a corporation of New York
Filed Sept. 27, 1965, Ser. No. 490,374
Int. Cl. H02p 5/00
U.S. Cl. 318—332                                    11 Claims

ABSTRACT OF THE DISCLOSURE

An electronic control circuit for a dental handpiece having a direct current electric motor attached thereto and provided with, a permanent magnet field and a rotatable armature, said circuit having a power transistor in series with the armature and having full rectification for providing a well-filtered, ripple-free direct current to the armature, together with means for maintaining a substantially constant motor speed for said dental handpiece over the range of possible motor speeds and over a wide variation in load at all speeds, especially at very low speeds of operation of the dental handpiece.

---

The invention relates to dental equipment and refers more specifically to an electronic control circuit for a dental motor or the like operable to maintain the speed of rotation of the motor substantially constant at different motor loads.

Dental equipment has been provided in accordance with commonly owned patent application Ser. No. 386,350 filed July 30, 1964, the disclosure of which is incorporated herein by reference in which a motor is attached to a dental handpiece and is controlled by an electronic control circuit in a foot controller between the motor and a source of electrical energy in accordance with the position of a foot actuated pedal.

With such structure using prior control circuits, on application of torque to the motor, such as through a polishing cup tool connected to the handpiece and engaged firmly with a tooth, the speed of rotation of the motor is reduced considerably. To maintain desired speed of operation of the tool in the handpiece it has previously been necessary for the dentist to control the power applied to the motor by movement of the foot pedal. Proper control of the speed of rotation of the motor and a tool carried by the dental handpiece during polishing and cleaning operations has therefore been particularly difficult in the past.

Wherein it has been previously attempted to provide an electronic control circuit for a dental motor compensated for torque applied to the motor through a dental handpiece or the like a plurality of obstacles have presented themselves. Thus with some prior control circuits the operation of the circuits to compensate for torque takes place immediately on starting of the motor so that unwanted compensation is provided during starting of the motor when motor torque is high due to bringing the motor up to speed. In other control circuits alternating current feedback from the motor to the circuit has adversely affected the quality of the constant speed compensation provided. Also, with some prior electronic motor control circuits the motors have had a tendency to coast when electric energy to the control circuits has been turned off allowing coasting of dental tools driven thereby which is objectionable in the practice of dentistry.

It is therefore the purpose of the present invention to provide an improved electronic control circuit for dental handpiece motors such as direct current permanent magnet field motors or shunt or series wound field direct current motors.

Another object is to provide an electronic control circuit for a motor for use with a dental handpiece or the like including means to maintain the motor at a substantially constant selected speed within a predetermined speed range regardless of load applied to the motor.

Another object is to provide an electronic control circuit for a dental handpiece motor including means for increasing the power applied to the motor with increase in the torque applied to the dental handpiece at low and medium motor speeds.

Another object is to provide an electronic control circuit as set forth above and further including means for preventing coasting of the dental handpiece on turnoff of electric energy to the control circuit.

Another object is to provide an electronic control circuit as set forth above and further including means for eliminating the increased power applied to the motor due to high load thereon while the motor is brought up to speed.

Another object is to provide an electronic control circuit as set forth above and further including means for preventing alternating current feedback from the motor into the electronic control circuit.

Another object is to provide an electronic control circuit for a dental handpiece motor or the like which is simple in construction, economical to manufacture and efficient in use.

Other objects and features of the invention will become apparent as the description proceeds, especially when the description is taken in conjunction with the accompanying drawing, illustrating a preferred embodiment of the invention, wherein:

FIGURE 1 is a schematic diagram of the electronic motor control circuit of the invention.

FIGURE 2 is a graph showing the relation between the speed of rotation of a dental handpiece and the torque applied to the dental handpiece with the electronic control circuit for the drive motor of the dental handpiece uncompensated.

FIGURE 3 is a graph showing the relation between the speed of rotation of a dental handpiece and the torque applied to the dental handpiece with the electronic control circuit for the drive motor of the dental handpiece compensated in accordance with the invention.

With reference to the figures of the drawing one embodiment of the present invention will now be considered in detail.

The electronic control circuit 10 illustrated in FIGURE 1 provides electric energy for the motor 12 from the source of alternating electric energy 14, which is compensated in accordance with the load applied to the motor 12. The control circuit 10 includes the structure 16 for providing a regulated voltage to the voltage compensating circuit portion 18. The compensated voltage from the voltage compensating circuit 18 is amplified through the power amplifier portion 20 of the control circuit 10 and fed to the motor reversing portion 22 of the control circuit 10.

In operation that portion of the regulated voltage used to drive the amplifier portion 20 of the electronic control circuit 10 is determined by the bias applied to the amplifier transistor 24. The bias applied to the amplifier transistor 24 is more particularly regulated by the condition of operation of the control transistor 26 while the condition of operation of the control transistor 26 is dependent on the conduction through the biasing transistor 28 which in turn is dependent upon the load applied to the motor 12.

Thus at low and medium speed of the motor 12 the electric energy fed to the motor 12 is increased as the torque or load on the motor 12 is increased through the operation of the compensating circuit 18 so that at low and medium speeds the motor 12 will run at a substantially constant speed of rotation regardless of the load applied thereto.

The electronic control circuit 10 also includes capacitors 30 and 130 for preventing an increase in the electric energy fed to the motor 12 due to high torque on bringing the motor 12 up to speed. Capacitors 32 and 130 are provided in the circuit 10 to prevent alternating current feedback from the motor 12 into the control circuit 10 and coasting of the motor 12 on opening of the foot switches 60 and 34 respectively.

More specifically, the structure 16 of the control circuit 10 for providing a controlled direct current voltage from the source of alternating electric energy 14 includes the transformer 36 having a primary winding 38 and a secondary winding 40, a full wave bridge rectifier 42 having the rectifier diodes 44, 46, 48 and 50 connected to the secondary winding 40 of the transformer 36 as shown in FIGURE 1, a filter capacitor 52 and the series connected Zener diode 54 and resistor 56 connected in parallel with the capacitor 52 across the output of the rectifier 42. The transformer 36 is connected to the source of electrical energy 14 through the fuse 58 and the foot pedal switch 60. An accessory outlet 62 is connected across the secondary winding 38 of the transformer 36 through the switch 63.

In operation when the switch 60 is closed the primary winding 38 of the transformer 36 is energized from the source of electric energy 14 which may be the usual 110–120 volt alternating electric current source. At the same time the accessory outlet 62 is energized providing that switch 63 is closed. A lower voltage is induced in the secondary winding 40 of the transformer 36 and is rectified through the rectifier 42. The voltage from the rectifier 42 is then applied across the capacitor 52 where it is filtered. The filtered, direct current electric signal which is approximately 31 volts is then applied across the resistor 56 and Zener diode 54 has a voltage of, for example, approximately 27 volts. The Zener diode 54 provides a regulated output voltage thereacross which is again filtered by the filter capacitor 64.

The compensating circuit portion 18 of the control circuit 10 includes a voltage divider network connected across the Zener diode 54 including the resistor 66, variable resistor 68, resistor 70, resistor 72 and sensing resistor 74.

The compensating circuit portion 18 of the control circuit 10 further includes the amplifier transistor 24 having a base 76 connected to the movable wiper arm 78 of the variable resistor 68. The wiper arm 78 is connected to a foot controller foot pedal as described in the above referenced patent application along with switch 60 and is varied with actuation of the foot pedal to vary the selected speed of rotation of the motor 12 as will be seen subsequently. As shown the collector 80 of the transistor 24 is connected to one side of the filter capacitor 52 while the emitter 82 of the transistor 24 is connected in series through resistor 84 and variable resistor 86 to the other side of the filter capacitor 52.

Thus the amplifying transistor 24 is connected across the direct electric signal provided from the rectifier 42 and filtered through capacitor 52 and provides a signal output across the resistors 84 and 86 to the bases 110 and 112 of power transistors 88 and 90 in accordance with the bias applied thereto. The bias applied to the amplifying transistor 24 is determined by the setting of the variably positioned wiper arm 78 on the resistor 68.

The bias applied to the amplifier transistor 24 is also varied in accordance with the voltage level of the resistor 68. The voltage level of the resistor 68 is varied in accordance with the resistance of the control transistor 26 having a collector 94 and an emitter 92 connected to the resistors 70 and 72. The base of the control transistor 26 is connected through a variable position wiper arm 132 to the resistor 86 in the emitter circuit of the amplifier transistor 24. Thus the initial operating characteristics of the control transistor 26 are determined by the setting of the wiper arm 132. As will be set forth subsequently the wiper arm 132 is set to operate the control transistor 26 in satuartion with the motor 12 of a dental handpiece as disclosed in the above referenced application operating under a no load condition.

The bias applied to the control transistor 26 is regulated during application of load to the motor 12 by the bias transistor 28, the base 98 of which is connected between the resistors 70 and 72, the collector 100 of which is connected to the base of the control transistor 26 and the emitter 102 of which is connected through resistor 104 between resistors 72 and 74.

In operation with the motor 12 up to speed without load applied thereto the amplifier transistor 24 amplifies the voltage provided by the setting of the variable position wiper arm 78 on the resistor 68 due to the position of the footpiece of a dental control unit as indicated in the above referenced patent application to provide a predetermined speed for the motor.

The control transistor 26 is operating in a saturated condition so that the resistance thereacross is relatively low. The transistor 28 is slightly conducting. When load is applied to the motor 12 the increased current through the resistor 74 makes the signal at the emitter 92 and resistor 72 go more negative due to the indicated polarity of the output signal from the rectifier 42. The transistor 28 thus is caused to conduct and provides a shunt around the lower portion of the resistor 86 through the resistor 104 after an initial period during which the capacitor 30 is charged.

The bias on the control transistor 26 is thus reduced so that the transistor 26 comes out of saturation to provide a larger resistance across the resistors 70 and 72. The raising of the resistance across the transistor 26 raises the voltage level of the resistor 68 so that a large voltage is applied to the movable wiper arm 78 for the same selected setting thereof. Since the power applied to motor 12 depends on the bias applied to transistor 24 across wiper arm 78 an increase in motor load will provide an increase in the power applied to the motor 12 for the same setting of the foot lever.

The circuit components are chosen such that at lower and medium motor speed ranges the additional power fed to the motor 12 due to the compensating circuit portion 18 of the electric control circuit 10 approximates as closely as possible that additional power necessary to maintain the motor speed 12 constant. The graph of FIGURE 3 illustrates the constant speed characteristics provided the dental handpiece through the electric control circuit 10 at speeds of up to 6000 r.p.m. The graph of FIGURE 2 illustrates the previous early stall of the handpiece on application of load or torque to the motor 12 when the compensating circuit portion 18 was not included in the control circuit 10.

As was indicated previously the capacitor 30 is positioned between the emitter 82 of the transistor 24 and the other side of resistor 84 and capacitor 130 is positioned between the base 98 of transistor 28 and the positive side of the output of the rectifier bridge to prevent the compensating circuit portion 18 of the control circuit 10 from operating during initial startup of the motor 12 due to the starting load of the motor itself. Thus the capacitors 30 and 130 are chosen to be of a size to charge in the length of time it takes the motor 12 to come up to speed without load applied thereto. Initially the capacitor 30 tends to place the transistor 26 in deep saturation due to the draining of the bias signal for the transistor 26 by the capacitor 30 during charging thereof. Capacitor 130 tends to place the transistor 28 into a non-conducting state due to draining of the bias signal for transistor 28 by the capacitor 130 during charging thereof. After the capacitors 30 and 130 have charged the compensating circuit 18 operates as indicated above.

The power amplifier circuit 20 includes the transistors 88 and 90 connected in parallel to increase the power handling capacity thereof. The transistors 88 and 90 are connected between the emitter 82 of amplifier transistor 24 and resistor 84 through the protection diode 108. The signal output to the motor 12 through the power amplifiers 88 and 90 is thus controlled in accordance with the signal through the amplifier transistor 24 since the signal across the resistors 84 and 86 drives the bases 110 and 112 of the transistors 88 and 90.

The collectors 114 and 116 of the transistors 88 and 90 are connected along with the collector 80 of the transistor 24 to the negative side of the output of the rectifier 42. The emitters 118 and 120 of the transistors 88 and 90 are connected together through the resistors 122 and 124, respectively, to provide an output across the quick blow fuse 126 which is provided so that a short or overload in the motor 12 will not damage the power transistors 88 and 90.

The motor reversing portion 22 of the control circuit 10 includes the double pole, single throw switch 128 operable in the two positions thereof to provide an electric current through the motor 12 and switch 34 in opposite directions. The switch 34 is connected to the foot controller of the dental equipment disclosed in the above referenced patent application and it is closed at any time the power switch 60 is closed by the foot lever. Opening the switch 34 with the foot control lever prevents coasting of the motor 12 which would otherwise occur due to the large value of the filter capacitor 52 and the tendency for the capacitor 52 to discharge to the motor 12 on opening of the switch 60.

In operation the motor 12 has a tendency to feedback an alternating current signal into the compensating circuit portion 18 of the electronic control circuit 10 which is undesirable. The alternating component of the feedback signal is therefore filtered by providing the filter capacitors 32, and 130 as shown in FIGURE 1.

In over-all operation of the electronic control circuit 10 to control the drive motor 12 as in conjunction with the dental equipment illustrated in the above referenced patent application the foot lever is moved to a predetermined position whereby the switches 60 and 34 are closed and the wiper arm 78 moved to a position to provide a predetermined speed of rotation of the motor 12, for example 3000 revolutions per minute. Closing the switch 60 with the switch 63 previously closed will cause the accessory outlet to be energized. The electric signal from the source of alternating current electric energy 14 will be passed through the transformer 36 to be rectified in the rectifier 24 and filtered by capacitor 52. A regulated voltage will be presented across the Zener diode 54.

Since at this time there is considerable load applied to the motor 12 due to bringing the motor 12 up to the desired speed the transistor 28 will be caused to conduct due to the negative going signal appearing across the sensing resistor 74. The transistor 26 is however at this time held in deep saturation due to the charging of the capacitor 30 and transistor 28 is at this time held into non-conduciton due to capacitor 130 charging. The motor 12 is thus brought up to speed in the usual manner by the power applied thereto through the power transistors 88 and 90 which are driven from the amplifier transistor 24 in accordance with the speed setting of the variable position wiper arm 78 of the resistor 68. After the motor is brought up to speed the signal across the resistor 74 returns to normal and the capacitors 30 and 130 are charged.

With the electronic control circuit 10 operating in this condition a load is applied to the motor 12 due for example to use of the dental handpiece in a high torque operation such as cleaning or polishing. With load applied to the motor 12 the signal across the sensing resistor 74 again goes negative turning on the now partially-conducting transistor 28. Through resistor 104 and the negative going signal across the sensing resistor 74 the control transistor 26 is caused to come out of saturation to vary the resistance in parallel with the resistor 68. This increases the bias and therefore the conduction of the amplifier transistor 24. The increase in bias applied to the amplifier 24 will produce an increased signal applied to the power amplifiers 88 and 90 across the resistors 84 and 86 to provide a larger output signal from the amplifiers 88 and 90 across the motor 12 so that the speed of the motor 12 is maintained substantially constant on application of torque thereto.

The circuit components are chosen such that the compensation is most effective at low and medium speeds as illustrated best in FIGURE 3, since there is a power limit on both the power transistors 88 and 90 and the motor 12 and it is not desired to burn out the motor 12 or power transistors in an effort to maintain a constant motor speed at high speeds.

As previously indicated during operation the capacitors 32, 96 and 130 filter any alternating components fed from the motor back to the control circuit 10. Also, as previously indicated, the switch 34 prevents coasting of the motor 12 due to the discharge of the filter capacitor 52 on opening of switch 60.

While one embodiment of the present invention has been considered in detail it will be understood that other embodiments and modifications are contemplated. It is the intention to include all embodiments and modifications that are defined by the appended claims within the scope of the invention.

What I claim as my invention is:

1. A source of electric energy, a motor for driving a dental handpiece or the like, and an electronic control circuit connected between the source of electric energy and the motor including means connected to the source of electric energy for providing a direct current source of electric energy having a predetermined regulated magnitude, means for amplifying a portion of the provided regulated electric signal in accordance with the speed of the motor desired and passing the amplified electric signal to the motor for rotating the motor at a predetermined speed including a voltage divider network across the regulated electric signal, an amplifier transistor having a base connected to a variable point on the voltage divider network, a collector connected to one side of the source of electric energy and an emitter connected through load resistors to the other side of the regulated source of electric energy, and a pair of power transistors driven by the signal across the load resistors in the emitter circuit of the amplified transistor connected in parallel to provide power to the motor, control means for varying the portion of the electric signal amplified and fed to the motor and bias means for regulating the control means in accordance with the load applied to the motor for maintaining a substantially constant motor speed on application of load to the motor.

2. A source of electric energy, a motor for driving a dental handpiece or the like, and an electronic control circuit connected between the source of electric energy and the motor including means connected to the source of electric energy for providing a direct current source of electric energy having a predetermined regulated magnitude, means for amplifying a portion of the provided regulated electric signal in accordance with the speed of the motor desired and passing the amplified electric signal to the motor for rotating the motor at a predetermined speed, control means for varying the portion of the electric signal amplified and fed to the motor bias means for regulating the control means in accordance with the load applied to the motor for maintaining a substantially constant motor speed on application of load to the motor and further including means for preventing coasting of the motor on disconnecting the electronic control circuit from the source of electric energy.

3. A source of electric energy, a motor for driving a dental handpiece or the like, and an electronic control circuit connected between the source of electric energy and the motor including means connected to the source of electric energy for providing a direct current source of electric energy having a predetermined regulated magnitude, means for amplifying a portion of the provided regulated electric signal in accordance with the speed of the motor desired and passing the amplified electric signal to the motor for rotating the motor at a predetermined speed, control means for varying the portion of the electric signal amplified and fed to the motor and bias means for regulating the control means in accordance with the load applied to the motor for maintaining a substantially constant motor speed on application of load to the motor and further including a switch connected in series with the motor and means for opening the switch when the electronic control circuit is disconnected from the source of electric energy.

4. A source of electric energy, a motor for driving a dental handpiece or the like, and an electronic control circuit connected between the source of electric energy and the motor including means connected to the source of electric energy for providing a direct current source of electric energy having a predetermined regulated magnitude, means for amplifying a portion of the provided regulated electric signal in accordance with the speed of the motor desired and passing the amplified electric signal to the motor for rotating the motor at a predetermined speed, control means for varying the portion of the electric signal amplified and fed to the motor and bias means for regulating the control means in accordance with the load applied to the motor for maintaining a substantially constant motor speed on application of load to the motor and further including means for preventing feedback of alternating current signals from the motor into ithe electronic control circuit.

5. A source of electric energy, a motor for driving a dental handpiece or the like, and an electronic control circuit connected between the source of electric energy and the motor including means connected to the source of electric energy for providing a direct current source of electric energy having a predetermined magnitude, means for amplifying a portion of the provided direct current in accordance with a first operating parameter of the motor desired and passing the amplified direct current to the motor, control means for varying the portion of the direct current amplified and fed to the motor and bias means for regulating the control means in accordance with a second operating parameter of the motor for maintaining the first operating parameter substantially constant.

6. Structure as set forth in claim 5 and further including means for preventing coasting of the motor after the source of electric energy is disconnected from the motor.

7. Structure as set forth in claim 5 wherein the means for amplifying a portion of the provided direct current includes a voltage divider network connected across the direct current source and an amplifier transistor having a base connected to a variable point on the voltage divider network, a collector connected to one side of the direct current source and an emitter connected through load resistors to the other side of the direct current source and the control means includes a control transistor having an emitter collector circuit connected across a portion of the voltage divider and a base connected to a variable position on the load resistors in the emitter circuit of the amplifier transistor.

8. Structure as set forth in claim 7 wherein the bias means includes a bias transistor having a base connected to the voltage divider between the emitter and collector of the control transistor, a collector connected to the base of the control transistor, and an emitter connected to short out a portion of the load resistors of the amplifier transistor between the base of the control transis.or and the other side of the provided direct current on conduction thereof and sensing means for sensing a load applied to the motor and varying the bias of the bias transistor to produce conduction thereof on load applied to the motor.

9. Structure as set forth in claim 8 and further including means for driving the control transistor into deep saturation and the bias transistor into non-conduction while the motor is being brought up to speed.

10. Structure as set forth in claim 8 and further including a capacitor connected between the emitter of the amplifier transistor and the load resistors and a capacitor connected between the emitter of the control transistor and the base of the bias transistor having a charging time substantially equal to the time for bringing the motor up to speed for driving the control transistor into deep saturation and the bias transistor into non-conduction during bringing of the motor up to speed.

11. Structure as set forth in claim 8 and further including at least one power transistor driven by the signal across the load resistors in the emitter circuit of the amplifier transistor and a capacitor connected between the base of the power transistor and the other side of the direct current source across the load resistors for the amplifier transistor, a capacitor connected between the collector of the control transistor and the other side of the direct current source and a capacitor connected between the base of the bias transistor and the other side of the direct current source for suppressing alternating current signals fed back to the control circuit from the motor.

References Cited

UNITED STATES PATENTS

| | | | |
|---|---|---|---|
| 3,095,534 | 6/1963 | Cockrell | 318—345 X |
| 3,134,065 | 5/1964 | Minarik | 318—332 |
| 3,177,417 | 4/1965 | Wright | 318—331 |

ORIS L. RADER, *Primary Examiner.*

G. SIMMONS, *Assistant Examiner.*

U.C. Cl. X.R.

318—341, 345